US012718738B2

(12) United States Patent
Park et al.

(10) Patent No.: US 12,718,738 B2
(45) Date of Patent: Aug. 25, 2026

(54) DISPLAY DRIVING CIRCUIT AND DISPLAY DEVICE THEREOF

(71) Applicant: Samsung Electronics Co., Ltd., Suwon-si (KR)

(72) Inventors: Jun-Hong Park, Suwon-si (KR); Oh Jae Kwon, Suwon-si (KR); Suk Ki Min, Suwon-si (KR); Taek Kyun Shin, Suwon-si (KR); Doo-Hee Lim, Suwon-si (KR); Young Ho Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/475,793

(22) Filed: Sep. 27, 2023

(65) Prior Publication Data

US 2024/0153435 A1 May 9, 2024

(30) Foreign Application Priority Data

Nov. 8, 2022 (KR) ........................ 10-2022-0147999

(51) Int. Cl.
*G09G 3/20* (2006.01)
*G09G 3/3275* (2016.01)
*G09G 3/36* (2006.01)

(52) U.S. Cl.
CPC ......... *G09G 3/2096* (2013.01); *G09G 3/3275* (2013.01); *G09G 3/3685* (2013.01); *G09G 2310/08* (2013.01); *G09G 2330/06* (2013.01)

(58) Field of Classification Search
None
See application file for complete search history.

(56) References Cited

U.S. PATENT DOCUMENTS 7,443,389 B1 10/2008 Alben
8,068,084 B2 11/2011 Yeo
(Continued)

FOREIGN PATENT DOCUMENTS

KR 2003-0073073 A 9/2003
KR 1020070095037 A 9/2007
(Continued)

OTHER PUBLICATIONS

Office Action dated Jan. 26, 2026 for Korean Application 10-2022-0147999.

*Primary Examiner* — Patrick N Edouard
*Assistant Examiner* — Peijie Shen
(74) *Attorney, Agent, or Firm* — Harness, Dickey & Pierce, P.L.C.

(57) ABSTRACT

A display driving circuit is provided. The display driving circuit includes a timing controller configured to output image data and a source control signal, a first source driver circuit configured to output first source data of the image data by activating a plurality of first data lines in accordance with the source control signal, the first data lines having a first output spreading time, a second source driver circuit configured to output second source data of the image data by activating a plurality of second data lines in accordance with the source control signal, the second data lines having a second output spreading time, and a third source driver circuit configured to output third source data of the image data by activating a plurality of third data lines in accordance with the source control signal, the third data lines having a third output spreading time, wherein the first output spreading time, the second output spreading time and the third output spreading time do not overlap.

18 Claims, 10 Drawing Sheets

(56) References Cited

U.S. PATENT DOCUMENTS 8,378,999 B2 * 2/2013 Fukuo .................. G09G 3/3688
345/97
9,099,023 B2 * 8/2015 Baek .................... G09G 3/3688
9,685,125 B2 * 6/2017 Ha ....................... G09G 3/3611
9,779,703 B2 10/2017 Hong et al.
9,928,799 B2 * 3/2018 Lee ...................... G09G 3/3688
10,269,284 B2 * 4/2019 Jung ..................... G06F 3/0412
10,410,599 B2 * 9/2019 Shin ...................... G06F 3/1446
10,504,413 B2 * 12/2019 Lee ...................... G09G 3/2092
10,957,265 B2 * 3/2021 Lee ...................... G09G 3/3607
11,817,032 B1 * 11/2023 Chen .................... G09G 3/2074
12,142,231 B2 * 11/2024 Komura ............... G09G 3/3611
2004/0189579 A1 * 9/2004 Shimizu ............... G09G 3/3688
345/98
2009/0058788 A1 * 3/2009 Ha ....................... G09G 3/3611
345/99
2010/0171688 A1 * 7/2010 Wang ................... G09G 3/3611
345/99
2011/0080382 A1 * 4/2011 Koo ......................... G09G 3/20
327/108
2012/0056857 A1 * 3/2012 Li ............................ G09G 3/20
345/204
2012/0098813 A1 * 4/2012 Park ..................... G09G 3/3677
345/87
2013/0009917 A1 * 1/2013 Hsu ...................... G09G 3/3688
345/204
2013/0021306 A1 * 1/2013 Kuo ......................... G09G 3/20
345/204
2014/0118235 A1 * 5/2014 Hong ..................... G09G 5/008
345/87
2014/0232713 A1 * 8/2014 Hsu ...................... G09G 3/3685
345/99
2015/0049076 A1 * 2/2015 Kim ......................... G09G 3/20
345/212
2015/0062105 A1 * 3/2015 Park ......................... G09G 3/36
345/212
2015/0325214 A1 * 11/2015 Ryu ..................... G09G 3/3688
345/99
2015/0346887 A1 * 12/2015 Cho .................... G06F 3/04166
345/174
2016/0063957 A1 * 3/2016 Shirasaki ............... G11C 19/28
345/213
2016/0125840 A1 * 5/2016 Oh ......................... G09G 5/006
345/76
2016/0188062 A1 * 6/2016 Jung ..................... G06F 3/0412
345/173
2016/0351129 A1 * 12/2016 Kim ..................... G09G 3/3258
2017/0193892 A1 * 7/2017 Ha ....................... G09G 3/2092
2018/0040267 A1 * 2/2018 Huang ................... G09G 3/006
2018/0122295 A1 * 5/2018 Kim ......................... G09G 3/20
2018/0190192 A1 * 7/2018 Kwon .................. G09G 3/3275
2018/0190238 A1 * 7/2018 Park ....................... G09G 5/008
2019/0189076 A1 * 6/2019 Yang .................... G09G 3/3688
2019/0237042 A1 * 8/2019 Hu ......................... G09G 5/008
2019/0304397 A1 * 10/2019 Im .......................... G09G 5/008
2019/0362666 A1 * 11/2019 Chen ........................ G09G 3/20
2019/0385550 A1 * 12/2019 Tian ..................... G09G 3/2003
2020/0118485 A1 * 4/2020 Choi ...................... G09G 3/325
2021/0201737 A1 * 7/2021 Kang ................... G09G 3/3688
2022/0148479 A1 * 5/2022 Pyun .................... G09G 3/3275
2022/0198989 A1 * 6/2022 Park ..................... G09G 3/2092
2023/0196980 A1 * 6/2023 Lee .......................... G09G 3/20
345/55
2023/0197015 A1 * 6/2023 Lee ...................... G09G 3/3275
345/204
2023/0206821 A1 * 6/2023 Gu ....................... G09G 3/2096
345/213

FOREIGN PATENT DOCUMENTS

KR 1491137 B1 6/2009
KR 10-2012-0133151 A 12/2012

* cited by examiner

DISPLAY DRIVING CIRCUIT AND DISPLAY DEVICE THEREOF

CROSS-REFERENCE TO RELATED APPLICATION

This application claims priority from Korean Patent Application No. 10-2022-0147999 filed on Nov. 8, 2022 in the Korean Intellectual Property Office and all the benefits accruing therefrom under 35 U.S.C. 119, the contents of which in its entirety are herein incorporated by reference.

BACKGROUND

As a display panel is gradually increased in its size, a display driving device includes a plurality of source driver circuits. When data are simultaneously output to data lines connected to the source driver circuits, broadband electromagnetic interference (EMI) may occur between adjacent data lines.

BRIEF SUMMARY

The inventive concepts relate to a display driving circuit, and more particularly, to a display driving circuit including a plurality of source driver circuits and a display device thereof.

An object of the inventive concepts is to provide a display device having improved EMI level.

Another object of the inventive concepts is to provide a method of manufacturing a semiconductor device, which may improve device performance and reliability.

Some example embodiments of the inventive concepts provide a display driving circuit including a timing controller configured to output image data and a source control signal, a first source driver circuit configured to output first source data of the image data by activating a plurality of first data lines in accordance with the source control signal, the first data lines having a first output spreading time, a second source driver circuit configured to output second source data of the image data by activating a plurality of second data lines in accordance with the source control signal, the second data lines having a second output spreading time, and a third source driver circuit configured to output third source data of the image data by activating a plurality of third data lines in accordance with the source control signal, the third data lines having a third output spreading time, wherein the first output spreading time, the second output spreading time, and the third output spreading time do not overlap.

Some example embodiments of the inventive concepts provide a display device including a display panel including a plurality of pixels connected to a plurality of first data lines and a plurality of second data lines, a timing controller configured to output a first source control signal and a second source control signal, a first source driver circuit configured to output first source data to first pixels, of the plurality of pixels, connected to the plurality of first data lines in a first output enable pattern in accordance with the first source control signal, and a second source driver circuit configured to output second source data to second pixels, of the plurality of pixels, connected to the plurality of second data lines in a second output enable pattern different from the first output enable pattern in accordance with the second source control signal.

Some example embodiments of the inventive concepts provide a display driving circuit including a first source driver circuit configured to output first image data to a plurality of first data lines of a display panel, a second source driver circuit configured to output second image data to a plurality of second data lines of the display panel and a timing controller configured to control the first source driver circuit and the second source driver circuit such that a first output spreading time of the first data lines and a second output spreading time of the second data lines are different from each other.

The objects of the inventive concepts are not limited to those mentioned above and additional objects of the inventive concepts, which are not mentioned herein, will be clearly understood by those skilled in the art from the following description of the inventive concepts.

DETAILED DESCRIPTION

Figure 1:
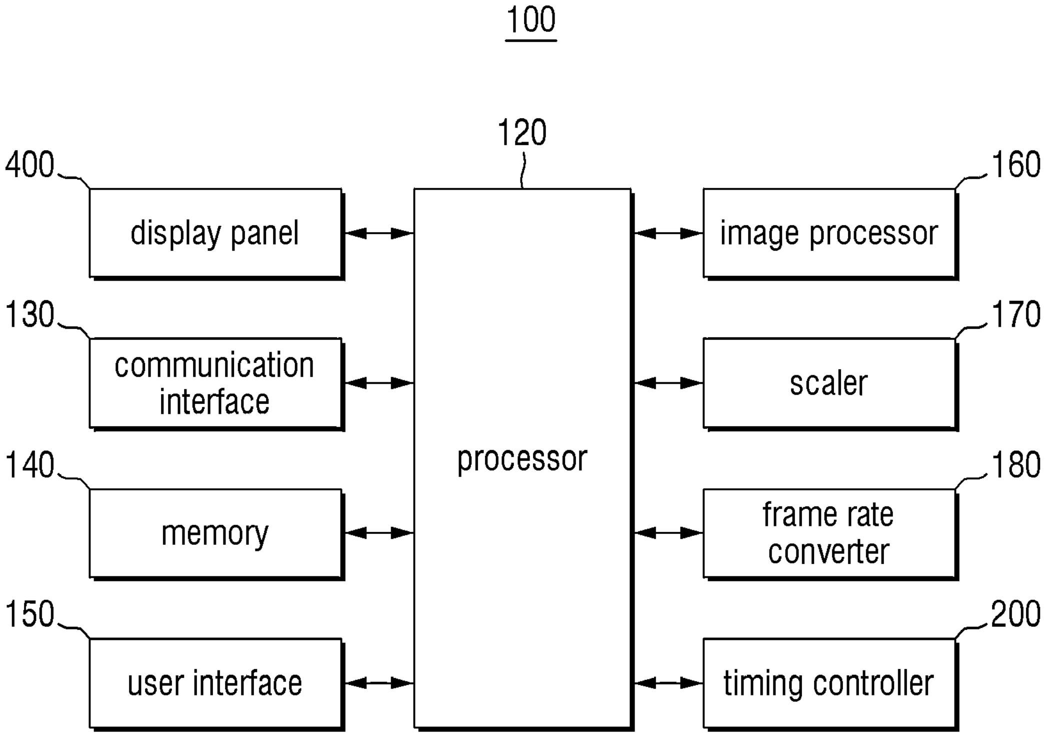
FIG. 1 is a block diagram illustrating a configuration of a display device 100 according to some example embodiments.

FIG. 1 is a block diagram illustrating a configuration of a display device 100 according to some example embodiments.

The display device 100 is a device for displaying contents, which may be a TV, a desktop PC, a laptop computer, a video wall, a large format display (LFD), a digital signage (digital signboard), a digital information display (DID), a projector display, a digital video disk (DVD) player, a refrigerator, a washing machine, a smartphone, a tablet PC, a monitor, smart glasses, a smart watch, etc. Any device capable of displaying contents may be the display device 100.

The display device 100 includes a display panel 400, a processor 120, a communication interface 130, a memory 140, a user interface 150, an image processor 160, a scaler 170, a frame rate converter 180, and/or a timing controller (TCON) 200, but is not limited thereto. The display device 100 may be implemented in a form from which some components are excluded, or may be implemented in a form in which other components are further included.

The display panel 400 may be implemented in various forms such as a Liquid Crystal Display (LCD), an Organic Light Emitting Diode (OLED), a Plasma Display Panel (PDP), a micro LED, a Laser Display, a VR, and/or Glass. The display panel 400 may also include a driving circuit, a backlight unit or the like, which may be implemented in the form of a-si TFT, a low temperature poly silicon (LTPS) TFT, an organic TFT (OTFT) or the like. The display panel 400 may be implemented as a touch screen coupled with a touch sensor, a flexible display, a three-dimensional (3D) display, etc.

The processor 120 controls an overall operation of the display device 100. In detail, the processor 120 may be connected to each component of the display device 100 to control the overall operation of the display device 100. For example, the processor 120 may be connected to a component such as the display panel 400 to control the operation of the display device 100. In addition, the processor 120 may include an image processor 160, a scaler 170, a frame rate converter 180 and/or a timing controller 200, but is not limited thereto, and each component may be implemented separately. In this case, the processor 120 may be connected to the image processor, the scaler, the frame rate converter and the timing controller to control the operation of the display device 100. This will be described with reference to the drawings that will be described later.

According to some example embodiments, the processor 120 may be implemented as a digital signal processor (DSP), a microprocessor and/or a timing controller (TCON), but is not limited thereto. The processor may include one or more of a central processing unit (CPU), a micro controller unit (MCU), a micro processing unit (MPU), a controller, an application processor (AP) or a communication processor (CP) and/or an ARM processor, and/or may be defined as a corresponding terminology. In addition, the processor 120 may be implemented as a System on Chip (SoC) and/or a Large Scale Integration (LSI), which is embedded with a processing algorithm, and/or may be implemented in the form of a Field Programmable Gate Array (FPGA).

The communication interface 130 is a component that performs communication with various types of external devices in accordance with various types of communication modes. For example, the display device 100 may receive contents and the like from an external device through the communication interface 130.

The communication interface 130 may include a WiFi module, a Bluetooth module, an infrared communication module, a wireless communication module and/or the like. In this case, each communication module may be implemented in the form of at least one hardware chip.

The WiFi module and the Bluetooth module perform communication in a WiFi method and a Bluetooth method, respectively. When the WiFi module and/or the Bluetooth module is used, various kinds of connection information such as SSID and a session key is first transmitted and received and communication is connected using the information, so that the information may be transmitted and/or received. The infrared communication module performs communication in accordance with an Infrared Data Association (IrDA) communication technology for wirelessly transmitting data to a short distance by using infrared rays between a visible ray and the millimeter wave.

The wireless communication module may include at least one communication chip that performs communication in accordance with various wireless communication specifications such as ZigBee, 3rd Generation (3G), 3rd Generation Partnership Project (3GPP), Long Term Evolution (LTE_, LTE Advanced (LTE-A), 4th Generation (4G) and/or 5th Generation (5G), in addition to the above-described communication modes.

The communication interface 130 may include a wired communication interface such as a high-definition multimedia interface (HDMI), a DP, a thunderbolt, a USB, an RGB, a D-SUB and/or a DVI.

In addition, the communication interface 130 may include at least one of a Local Area Network (LAN) module, an Ethernet module and/or a wired communication module for performing communication by using a pair cable, a coaxial cable, an optical fiber cable and/or the like.

The memory 140 may refer to hardware for storing information such as data in an electric or magnetic form so that the processor 120 or the like may access. To this end, the memory 140 may be implemented as at least one of a non-volatile memory, a volatile memory, a flash memory, a hard disk drive (HDD), a solid state drive (SSD), a RAM, and/or a ROM.

At least one instruction or module required, or sufficient, for the operation of the display device 100 and/or the processor 120 may be stored in the memory 140. In this case, the instruction is a sign unit indicating the operation of the display device 100 and/or the processor 120, and may be made of a machine language that is a language that may be understood by a computer. The module may be an instruction set of a series of instructions that perform a particular task of a task unit.

The memory 140 may store data that is information of a bit or byte unit that may represent a character, a number, an image and/or the like. For example, contents, display driving control information and/or the like may be stored in the memory 140.

The memory 140 is accessed by the processor 120, and read/write/correction/deletion/update of instructions, modules and/or data may be performed by the processor 120.

The user interface 150 may be implemented as a button, a touch pad, a mouse, a keyboard or a remote controller, and/or may be implemented as a touch screen capable of performing the above-described display function and a manipulation input function. In this case, the button may include various types of buttons such as a mechanical button, a touch pad and/or a wheel, which are formed on any area, such as a front surface portion, a side portion and/or a rear surface portion, at an external appearance of a main body of the display device 100.

The display device 100 may further include a microphone (not shown), and may receive a user voice through the microphone. The display device 100 may digitize the user voice received through the microphone and perform a corresponding operation based on the digitized user voice. Alternatively, the display device 100 may receive a user voice, which is input by a separate device such as a remote control device (not shown), from the corresponding device.

In this case, the remote control device may be a device manufactured to control the display device 100, but is not limited thereto. The remote control device may be a device in which an application for controlling the display device 100 is installed in a device such as a smartphone.

In this case, the display device 100 may include an IR RX module, and may receive a control signal from the remote control device through the IR RX module, but is not limited thereto. The display device 100 may receive the control signal from the remote control device through Bluetooth, WiFi and/or the like, and any communication specification capable of receiving the control signal from the remote control device may be used.

The remote control device may include a microphone for receiving a user voice, and/or a communication module for digitizing the received user voice and transmitting the digitized user voice to the display device 100.

The processor 120 may directly identify the digitized user voice, but may transmit the digitized user voice to an external server such as an STT server and receive a corresponding control command from the external server.

The image processor 160 may image-process contents. For example, each image processor 160 may decode the received contents.

The scaler 170 may adjust resolution of the contents. For example, the scaler 170 may adjust vertical resolution of the contents based on an equivalent value of vertical resolution of the display panel 400.

The frame rate converter 180 may change a frame rate of the contents. For example, when the display device 100 operates in a first frame mode, the frame rate converter 180 may change the contents of the first frame rate into contents of the second frame rate through a frame skip. Alternatively, when the display device 100 operates in a second frame mode, the frame rate converter 180 may change the contents of the second frame rate into the contents of the first frame rate through frame copying and/or interpolation.

According to some example embodiments, the timing controller 200 may convert image signals input from another component (for example, the processor 120) into data signals, for example, RGB data or YUV data and generate a plurality of control signals (or driving signals) for controlling an operation of the display driving circuit 600.

Although the image processor 160, the scaler 170, the frame rate converter 180 and the timing controller 200 have been described as being individually implemented, the inventive concepts are not limited thereto. For example, at least a portion of the image processor 160, the scaler 170, the frame rate converter 180 and/or the timing controller 200 may be implemented as one component. In addition, at least a portion of the image processor 160, the scaler 170, the frame rate converter 180 and/or the timing controller 200 may be implemented as one component of the display panel 400 and/or the processor 120.

Figure 2:
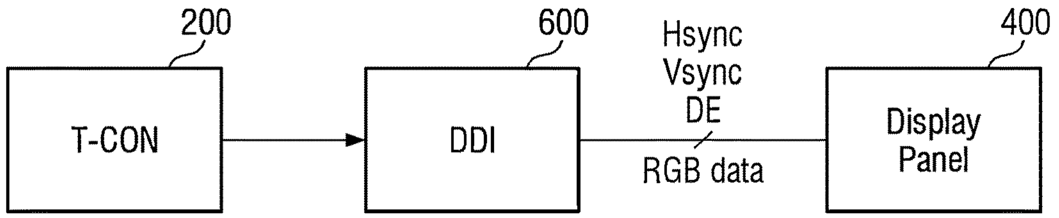
FIGS. 2 and 3 are views illustrating a display driving circuit and a display panel according to some example embodiments.
Figure 3:
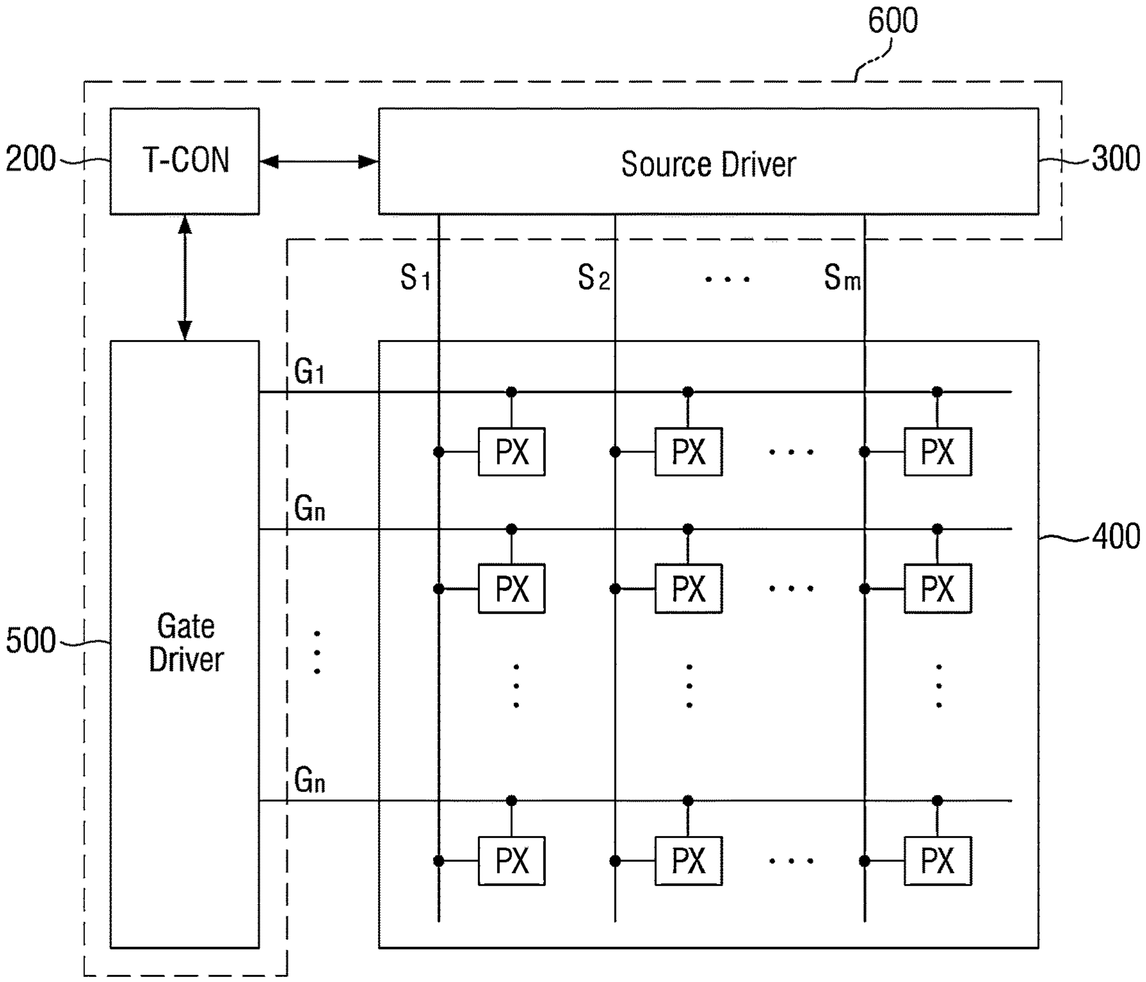

FIGS. 2 and 3 are views illustrating a display driving circuit and a display panel according to some example embodiments.

Referring to FIG. 2, a display panel 400 may be driven by being connected to a display driving circuit 600 in accordance with some example embodiments. For example, the display driving circuit 600 is connected between the processor 120 and the display panel 400 and between the timing controller 200 and the display panel 400. The processor 120 may control the overall operation of the display device 100, and the display driving circuit 600 may drive the display panel 400 under the control of the processor 120.

The timing controller 200 may generate serial data streams, which include RGB data or YUV data for displaying an image on the display panel 400 in units of frames, and may output the generated serial data streams to the display driving circuit 600 through signal lines.

Figure 4:
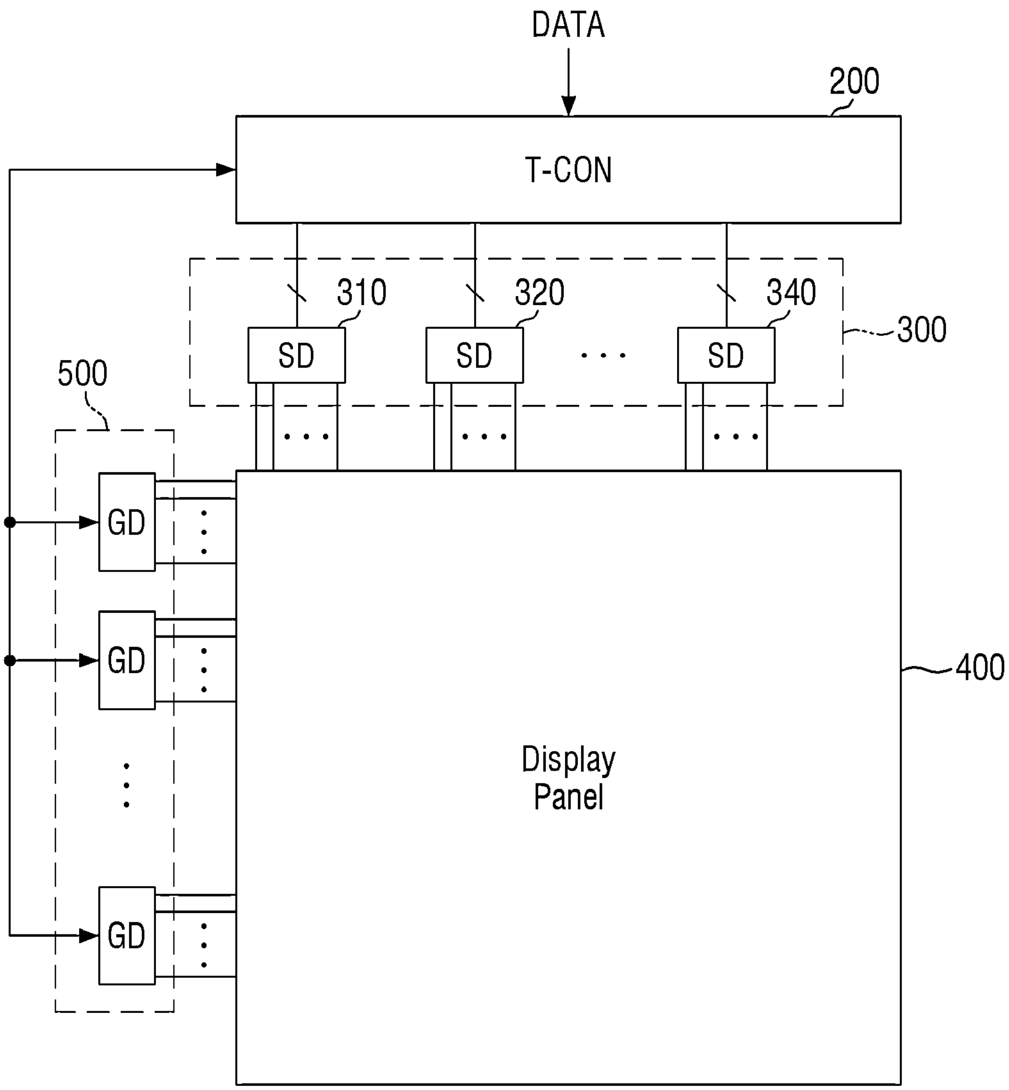
FIG. 4 is a view illustrating a display driving circuit and a display panel according to some example embodiments.

The display driving circuit 600 may be implemented as including the timing controller 200 as shown in FIG. 3 in accordance with some example embodiments, or the timing controller 200 and the display driving circuit 600 may be separately implemented as shown in FIG. 4 in accordance with some example embodiments.

According to some example embodiments, the display driving circuit 600 may receive data packets from the timing controller 200 through an interface and output a horizontal synchronization signal Hsync, a vertical synchronization signal Vsync, a data enable signal DE, display data (RGB data) and/or an operation clock (e.g., PCLK). For example, the operation clock PCLK may be a main clock (e.g., MCLK) itself input from the processor 120, or may be a clock transformed from the main clock MCLK input from the processor 120 under the control of the timing controller 200 in accordance with some example embodiments.

In accordance with some example embodiments, the timing controller 200 may receive a feedback signal 'f' from a source driver circuit 300 inside the display driving circuit 600 and reset the operation clock PCLK, an image data signal, a source control signal C and/or the like, which are provided to the source driver circuit 300 in accordance with the feedback signal.

According to some example embodiments, the display driving circuit 600 may control various interfaces. For example, the interfaces may include Reduced Swing Differential Signaling (RSDS), mini-LVDS, Point-to-Point Differential Signaling (PPDS), Advanced Intra-Panel Interface (AiPi), mobile industry processor interface (MIPI), mobile display digital interface (MDDI), serial peripheral interface (SPI), inter-integrated circuit (I2C) and/or compact display port (CDP).

The display driving circuit 600 may output display data (RGB data) (or image data streams) to the display panel 400 at a set frame rate.

FIG. 4 is a view illustrating a display driving circuit and a display panel according to some example embodiments.

Referring to FIGS. 3 and 4, the display driving circuit 600 may include a gate driver circuit 500 and/or a source driver circuit 300. According to some example embodiments, the display driving circuit 600 may include a timing controller 200 (e.g., FIG. 3), or the display driving circuit 600 and the timing controller 200 may be separately and independently implemented (e.g., FIG. 4).

The display panel 400 may include a plurality of pixels PX disposed along a plurality of gate lines G1 to Gn and a plurality of source lines S1 to Sm. According to some example embodiments, in the display panel 400, for example, the gate lines G1 to Gn and the source lines S1 to Sm may be alternately disposed in a matrix form. For example, a gate signal may be supplied to the gate lines, and an image data signal corresponding to the display data (RGB data) may be supplied to the data lines S1 to Sm. The image data signal corresponding to the display data (RGB data) may be provided to the source driver circuit 300 under the control of the timing controller 200.

According to some example embodiments, the timing controller 200 may provide the operation clock (e.g., PCLK) for the operation of the gate driver circuit 500 and/or the source driver circuit 300, the gate control signal for controlling the operation of the gate driver 500 and the source control signal C for controlling the operation of the source driver circuit 300.

According to some example embodiments, the source driver circuit 300 activates the data lines in accordance with the source control signal C received from the timing controller 200, provides the image data to the source lines S1 to Sm, that is, the data lines and/or outputs the image data to the display panel.

According to some example embodiments, the source driver circuit 300 may be implemented with a plurality of source driver circuits 310, 320, . . . , 340 in accordance with the size of the display panel as shown in FIG. 4. For example, the source driver circuit 300 may include a first source driver circuit 310 connected to the first data lines D1 to Dn of the display panel 400, a second source driver circuit 320 connected to the second data lines (D1 to Dn of 320) of the display panel and/or a third source driver circuit 330 connected to the third data lines (D1 to Dn of 330) of the display panel 400.

According to some example embodiments, the gate driver circuit 500 may be implemented as a plurality of gate driver circuits depending on the size of the display panel as shown in FIG. 4. The number of chips included in the display driving circuit, for example, the number of source driver circuits 300 and/or the number of gate driver circuits 140 may vary depending on the size of the display panel 400 and/or the number of colors to be expressed. The source driver circuit 300 is an example of a data line driving circuit.

The plurality of pixels included in the display panel may be connected to the first data lines (D1 to Dn of 310), the second data lines (D1 to Dn of 320) and/or the third data lines (D1 to Dn of 330), and are not repeatedly connected to the data lines different from each other. For example, the first pixels connected to the first data lines are not connected to the second data lines or the third data lines. The second pixels connected to the second data lines are not connected to the third data lines or the first data lines. The third pixels connected to the third data lines are not connected to the first data lines or the second data lines. That is, all, or one or more, of the first pixels connected to the first data lines, the second pixels connected to the second data lines and the third pixels connected to the third data lines are all, or one or more, displayed. That is, each of the first pixels, the second pixels and the third pixels may be a portion of the entire pixels included in the display panel.

The gate driver circuit 500 may drive a switching element (not shown) by applying voltages (e.g., VGH and/or VGL) to the plurality of gate lines G1 to Gn. The source driver circuit 300 may charge the pixels by converting the display data (RGB data) transmitted as a digital value into an analog value.

In some example embodiments, the display driving circuit 600 may output an image in units of frames. During a time (hereinafter, referred to as a scan time) required, or sufficient, to display one frame, which is output, on the display panel 400, the gate driver circuit 500 may sequentially scan the plurality of gate lines G1 to Gn.

The source driver circuit 300 may input a signal (hereinafter, referred to as a data signal) corresponding to the display data (RGB data) to the pixels PX during a time at which the gate driver circuit 500 scans each, or one or more, of the plurality of gate lines G1 to Gn. The pixels display an image in accordance with the input data signal. For example, the RGB data may be implemented as 18 bits, 24 bits, 30 bits (also, each of the RGB data is 6 bits or 8 bits or 10 bits).

Figure 5:
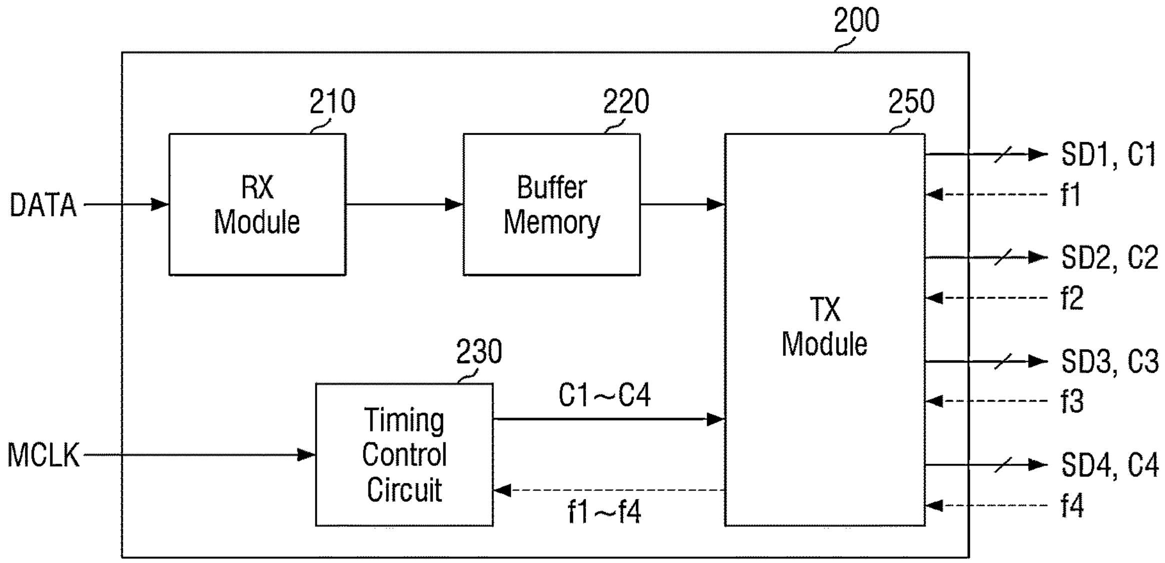
FIG. 5 is a detailed block diagram illustrating a timing controller 200 according to some example embodiments.

FIG. 5 is a detailed block diagram illustrating a timing controller 200 according to some example embodiments.

Referring to FIG. 5, the timing controller 200 may generate driving signals for driving each, or one or more, source driver IC 300 and each, or one or more, gate driver IC 500 based on a control signal, image data DATA and/or a main clock MCLK, which are received from the processor 120. Although the main clock is shown as being input from the outside such as the processor in some example embodiments of FIG. 5, a clock generated by restoring a clock signal from an input signal Data input to the timing controller 200 may be used as the main clock.

The timing controller 200 may include a reception (RX) module 210, a buffer memory 220, a timing control circuit 230 and/or a transmission (TX) module 250.

The RX module 210 receives image data from the outside such as the processor 120 and outputs the image data to the buffer memory 220. The buffer memory 220 stores data input to the timing controller 210 through the RX module 210 and outputs the data to the TX module 250. For example, the buffer memory 220 may store the image data for each, or one or more, of the source driver circuits 310 to 340. For example, the buffer memory 220 may store image data, in which control signals Hsync, Vsync and/or Dsync are combined, while being distinguished in units of frames and for each, or one or more, source driver circuit.

The timing control circuit 230 may output source control signals C1, C2, C3 and/or C4 based on the received main clock MCLK. According to some example embodiments, the timing control circuit 230 may output each, or one or more, of the source control signals C1, C2, C3 and/or C4 that are randomly activated. As used herein, the term "randomly activated" means that the source control signals C1, C2, C3 and/or C4 are activated in a random order without being activated at the same time. According to some example embodiments, the source control signals C1, C2, C3 and/or C4 may have an activation period that is equal to a frame period or a multiple of the frame period.

According to some example embodiments, the TX module 250 may output the source control signals C1 to C4 and/or the image data stored in the buffer memory 220 for each, or one or more, of the source driver circuits 310 to 340. For example, the TX module 250 may output source driving data SD1 to SD4 together with the source control signals C1 to C4 in accordance with the output order of the source control signals C1 to C4.

According to some example embodiments, the TX module 250 may receive feedback signals f1 to f4 from the source driver circuits 310 to 340. According to some example embodiments, the timing control circuit 230 may receive the feedback signals f1 to f4 through the TX module 250 and change an activation time point of the source control signals C1 to C4 based on the feedback signals f1 to f4.

Figure 6:
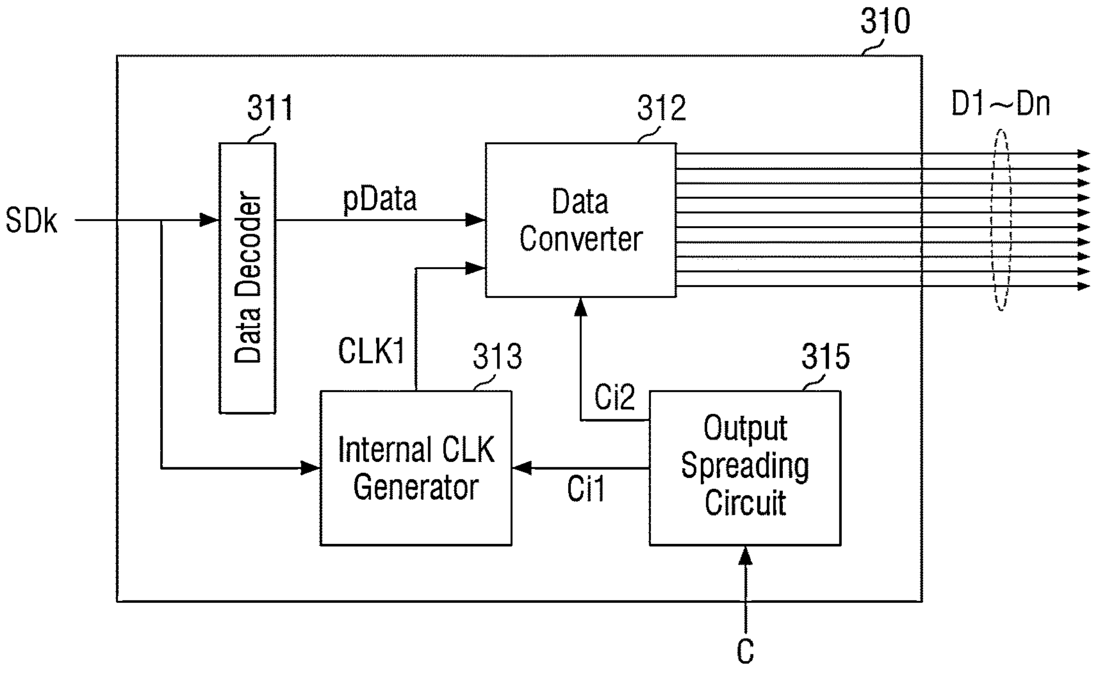
FIG. 6 is a detailed block diagram illustrating a source driver circuit 310 according to some example embodiments.

FIG. 6 is a detailed block diagram illustrating a source driver circuit 310 according to some example embodiments.

Referring to FIG. 6, the source driver circuit 310 may include a data decoder 311, a data converter 312 and/or an internal clock generator 313.

According to some example embodiments, the data decoder 311 may decode the source driving data SDk (k is any one of 1 to 4) output from the timing controller 200 to restore a plurality of control signals and/or data signals, for example, a horizontal synchronization signal Hsync, a vertical synchronization signal Vsync and/or a data synchronization signal Dsync and restore source data of a corresponding source driver circuit.

According to some example embodiments, the data decoder 311 distinguishes only image data pData among the restored signals and outputs the distinguished image data to the data converter 312.

The internal clock generator 313 generates an internal operation clock CLK1 in accordance with the control signals restored from the source driving data SDk, for example, the horizontal synchronization signal Hsync, the vertical synchronization signal Vsync and/or the data synchronization signal Dsync.

According to some example embodiments, the internal clock generator 313 may directly receive the source control signals C1 to C4 to generate an internal clock CLK1 corresponding to the source control signals C1 to C4.

According to some example embodiments, the source driver circuit 310 may further include an output spreading circuit 315. The output spreading circuit 315 may generate an output spreading pattern Ci2 in accordance with the source control signals C1 to C4.

According to some example embodiments, the output spreading circuit 315 includes a plurality of output enable patterns, and outputs any one pattern Ci2 corresponding to the source control signals C1 to C4 to the data converter 312. The data converter 312 activates the output of the data lines D1 to Dn based on the received output spreading pattern Ci2. The data converter 312 converts the image data pData received in the serial stream in parallel and outputs the converted image data to the data lines D1 to Dn in accordance with the activated pattern.

According to some example embodiments, the output spreading circuit 315 may output a clock control signal Ci1 to the internal clock generator 313 based on the source control signals C1 to C4. The internal clock generator 313 may adjust a high duty (high width), a low duty (low width) and an enable starting time of the internal operation clock CLK1 based on the clock control signal Ci1 to output the adjusted result to the data converter 312.

According to some example embodiments, the data converter 312 outputs the image data converted in parallel in accordance with at least one of the output spreading pattern Ci2 corresponding to the source control signals C1 to C4 or the internal operation clock CLK1 adjusted based on the source control signals C1 to C4, to the data lines D1 to Dn.

Figure 7:
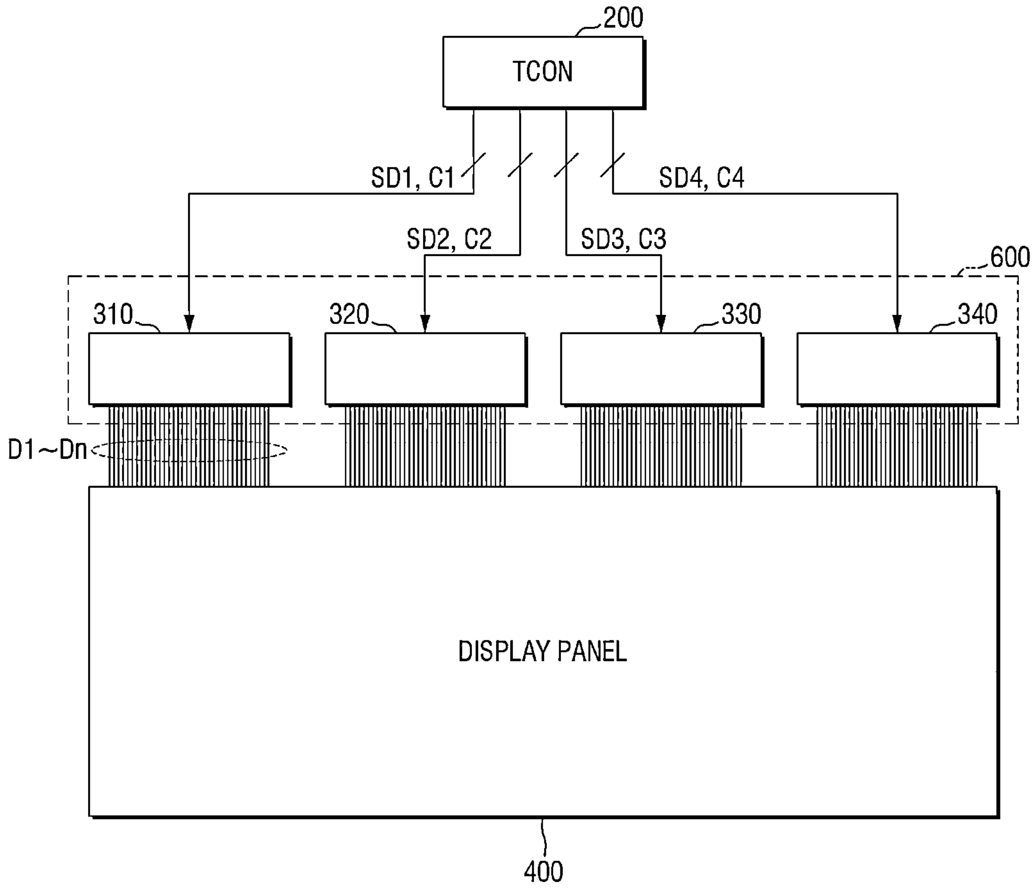
FIG. 7 is a conceptual view illustrating an operation of a display device according to some example embodiments.

FIG. 7 is a conceptual view illustrating an operation of a display device according to some example embodiments.

Referring to FIG. 7, the display device 100 may include a timing controller 200, a display driving circuit 600 including a plurality of first to fourth source driver circuits 310, 320, 330 and/or 340, and/or a display panel 400. The first to fourth source driver circuits 310, 320, 330, and/or 340 may include first to fourth source drivers 310, 320, 330, and/or 340, respectively. Although four source driver circuits are shown in FIG. 7, the number of source driver circuits is not limited thereto, and the number of source drivers of the display driving circuit according to some example embodiments may be determined depending on resolution of the display panel and/or the size of the display panel.

The timing controller 200 may be connected to the first to fourth source driver circuits 310, 320, 330 and/or 340 in a point-to-point manner to provide the image data and the source control signals C1, C2, C3 and/or C4. The timing controller 200 may provide the input data (RGB Data) to the respective source driver circuits 310, 320, 330 and/or 340 through the data lines in accordance with the source control signals C1, C2, C3 and/or C4.

According to some example embodiments, the first source driver circuit 310 is connected to the plurality of first data lines (D1 to Dn of 310) of the display panel 400, the second source driver circuit 320 is connected to the plurality of second data lines (D1 to Dn of 320) of the display panel 400, the third source driver circuit 330 is connected to the plurality of third data lines (D1 to Dn of 330) of the display panel 400, and the fourth source driver circuit 340 is connected to the plurality of fourth data lines (D1 to Dn of 340) of the display panel 400. The first data lines, the second data lines, the third data lines and the fourth data lines may refer to those provided by grouping of data lines connected to the same source driver circuit.

The pixels included in the display panel 400 may be connected to any one of the first data lines, the second data lines, the third data lines and/or the fourth data lines to receive the image data from each of the source driver circuits (one of 310, 320, 330 and/or 340) respectively connected to the first data lines, the second data lines, the third data lines and/or the fourth data lines.

Each, or one or more, of the first data lines, the second data lines, the third data lines and/or the fourth data lines is activated with different output patterns in accordance with the source control signals C1, C2, C3 and/or C4. When the image data of all, or one or more, of the data lines is simultaneously output to the display panel 400, ElectroMagnetic Interference (EMI) may occur due to interference between the data lines, thereby affecting the image data provided to the display panel 400 as noise. Therefore, image data output spreading times of the first data lines, the second data lines, the third data lines and/or the fourth data lines may be controlled differently from one another, whereby occurrence of EMI may be reduced, or removed, or minimized. Accordingly, the display panel 400 according to example embodiments may display an image with reduced or no interference and/or the image may be clearer.

According to some example embodiments, the source control signals C1, C2, C3 and/or C4 may be multi-bit type digital signals as the same source control signal. For example, when the source control signals C1, C2, C3 and/or C4 are implemented as multi-bit signals, the operation of each, or one or more, source driver circuit may be controlled in accordance with a bit value corresponding to each, or one or more, position. For example, when one source driver circuit is controlled by a 2-bit signal, the source control signals C1, C2, C3 and/or C4 are received as multi-bit signals such as aabbccdd, and the operation of the source driver circuit 310 may be controlled in accordance with a bit value 'aa', the operation of the source driver circuit 320 may be controlled in accordance with a bit value 'bb', the operation of the source driver circuit 330 may be controlled in accordance with a bit value 'cc' and the operation of the source driver circuit 340 may be controlled in accordance with a bit value 'dd'.

Otherwise, according to some example embodiments, the source control signals C1, C2, C3 and/or C4 may be multi-bit type digital signals having different values. For example, the timing controller 200 may output the source control signal C1 to the source driver circuit 310, output the source control signal C2 to the source driver circuit 320, output the source control signal C3 to the source driver circuit 330 and/or output the source control signal C4 to the source driver circuit 340.

Otherwise, according to some example embodiments, the source control signals C1, C2, C3 and/or C4 may be analog signals having different values.

Figure 8:
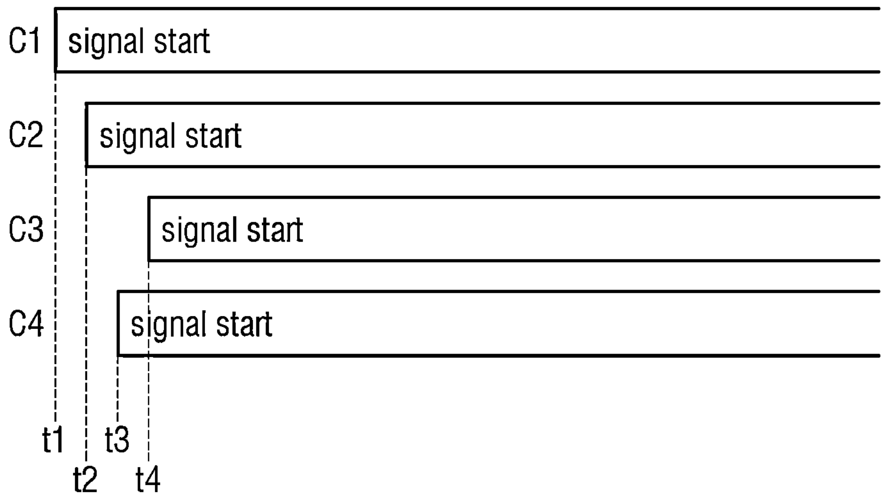
FIG. 8 is a timing diagram of a data signal input to a source driver circuit to describe an operation of a display device according to some example embodiments.

FIG. 8 is a timing diagram of a data signal input to a source driver circuit to describe an operation of a display device according to some example embodiments.

According to some example embodiments, the timing controller 200 randomly controls a time point at which image data is input to each, or one or more, of the source driver circuits 310, 320, 330 and/or 340 to differently control an output spreading time in the first data lines, the second data lines, the third data lines and/or the fourth data lines. According to some example embodiments, the timing controller 200 may control a time point at which image data is input to the display panel 400 by varying the time points t1, t2, t3 and/or t4 for activating the respective source driver circuits 310 to 340 in accordance with the source control signals C1, C2, C3 and/or C4.

In the shown example, the first source driver circuit 310 may receive an image data signal at the time point t1, the second source driver circuit 320 may receive an image data signal at the time point t2, the fourth source driver circuit 340 may receive an image data signal at the time point t3, and the third source driver circuit 330 may receive an image data signal at the time point t4. That is, the data lines may be activated in the order of the first source driver circuit 310, the second source driver circuit 320, the fourth source driver circuit 340 and the third source driver 330.

Therefore, the output spreading time may be different between adjacent source driver circuits, for example, between the first source driver circuit 310 and the second source driver circuit 320, between the second source driver circuit 320 and the third source driver circuit 330, and between the third source driver circuit 330 and the fourth source driver circuit 340, whereby occurrence of EMI may be reduced or minimized. Accordingly, the display panel 400 according to example embodiments may display an image with reduced or no interference and/or the image may be clearer.

Alternatively, according to some example embodiments, the timing controller 200 may control the source driver circuits, which have a close distance between the data line, among the plurality of source driver circuits, to allow a difference in the output spreading time to be increased, thereby reducing or minimizing occurrence of EMI. For example, with respect to the first source driver circuit, the source driver circuit having a close distance between the data lines may be the second source driver circuit 320 adjacent thereto, and the source driver circuit having a remote distance between the data lines may be the fourth source driver circuit 340. In this case, the image data may be input in the order of 310, 340 and 320.

Figure 9A:
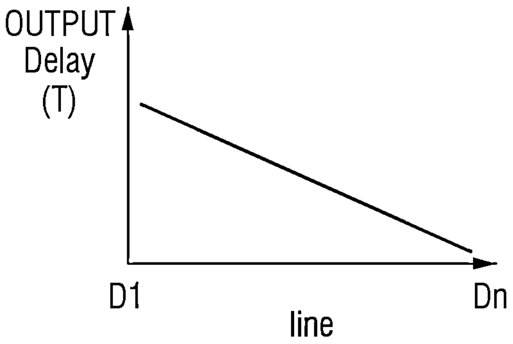
FIG. 9A illustrates a first output enable pattern of a first source driver circuit 310.
Figure 9B:
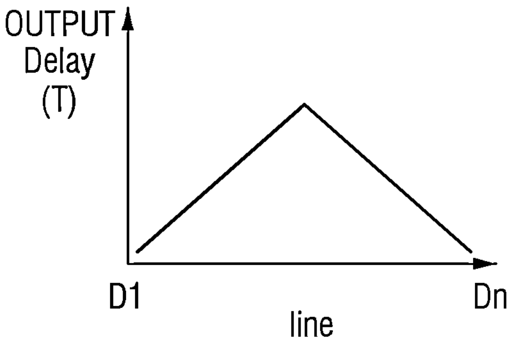
FIG. 9B illustrates a second output enable pattern of a second source driver circuit 320.
Figure 9C:
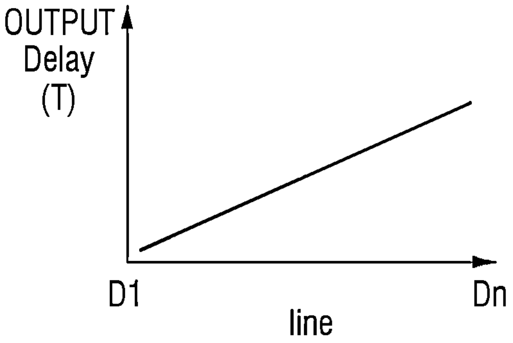
FIG. 9C illustrates a third output enable pattern of a third source driver circuit 330.
Figure 9D:
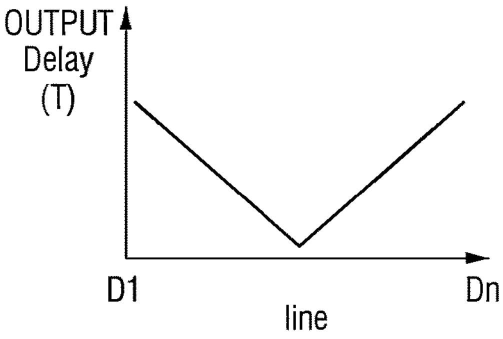
FIG. 9D illustrates a fourth output enable pattern of a fourth source driver circuit 340.

FIGS. 9A to 9D are timing diagrams of a data signal output to a display panel by a source driver circuit to describe an operation of a display device according to some example embodiments. In detail, FIG. 9A illustrates a first output enable pattern of a first source driver circuit 310, FIG. 9B illustrates a second output enable pattern of a second source driver circuit 320, FIG. 9C illustrates a third output enable pattern of a third source driver circuit 330, and FIG. 9D illustrates a fourth output enable pattern of a fourth source driver circuit 340.

In the shown example, it is assumed that the display panel includes a plurality of pixels respectively connected to a total of 4(n+1) data lines, and each source driver circuit is connected to each of (n+1) data lines. The first output enable pattern (FIG. 9A) has an output spreading time at which an output time point of an (n)th data line is the fastest and an output time point becomes slow toward a (0)th data line. The second output enable pattern (FIG. 9B) has an output spreading time at which the output time points of the (0)th and (n)th data lines are the fastest and the output time points become slow toward an intermediate data line. The third output enable pattern (FIG. 9C) has an output spreading time at which the output time point of the (0)th data line is the fastest and the output time point becomes slow toward the (n)th data line. The fourth output enable pattern (FIG. 9D) has an output spreading time at which the output time point of the intermediate data line is the fastest and the output time point becomes slow toward the (0)th and (n)th data lines.

According to some example embodiments, the source driver circuits 310, 320, 330 and/or 340 may include an output spreading circuit (e.g., 315 in FIG. 6) having different output enable patterns for each source driver circuit. In this case, the timing controller 200 may output the image data to the respective source driver circuits 310, 320, 330 and/or 340 without a source control signal, and the source driver circuits 310, 320, 330 and/or 340 may output the image data to the display panel in accordance with the output enable pattern embedded in each output spreading circuit.

According to some example embodiments, the source driver circuits 310, 320, 330 and/or 340 may include an output spreading circuit (e.g., 315 in FIG. 6) having a plurality of output enable patterns. In this case, the source driver circuits 310, 320, 330 and/or 340 may select any one output enable pattern in accordance with the source control signals C1, C2, C3 and/or C4 received from the timing controller 200, and may vary the output spreading time of the image data through the selected output enable pattern.

Figure 10:
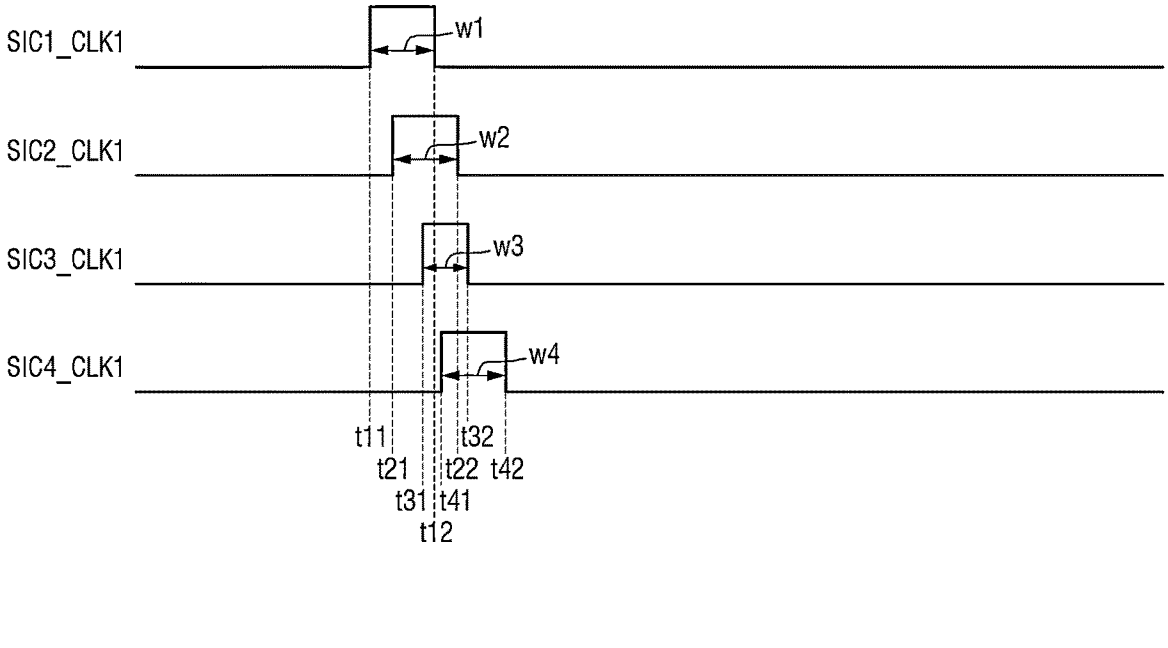
FIG. 10 is a timing diagram of an internal operation clock CLK1 generated for each source driver circuit to describe an operation of a display device according to some example embodiments.

FIG. 10 is a timing diagram of an internal operation clock CLK1 generated for each, or one or more, source driver circuit to describe an operation of a display device according to some example embodiments.

Referring to FIG. 10, the timing controller 200 outputs the source control signals C1 to C4 to the source driver circuits 310, 320, 330 and/or 340. The source driver circuits 310, 320, 330 and/or 340 respectively generate internal clocks 310_CLK1, 320_CLK1, 330_CLK1 and/or 340_CLK1 in the internal clock generator 313 based on the source control signals C1 to C4. The internal clock CLK1 generated in each, or one or more, of the source driver circuits 310, 320, 330 and/or 340 may be generated such that at least one of a high duty (high width), a low duty (low width) and/or an enable starting time is different from another one, based on the source control signal.

For convenience of description, it is assumed that an input time point of the first internal clock 310_CLK1 for the first source driver circuit 310 is t11, an input time point of the second internal clock 320_CLK1 for the second source driver circuit 320 is t21, an input time point of the third internal clock 330_CLK1 for the third source driver circuit 330 is t31 and an input time point of the fourth internal clock 340_CLK1 for the fourth source driver circuit 340 is t41.

According to some example embodiments, the timing controller 200 may control the source driver circuits 310, 320, 330 and/or 340 through the source control signal so that the internal clocks do not overlap equally.

For example, the timing controller 200 may provide the first source driver circuit 310, the second source driver circuit 320, the third source driver circuit 330 and/or the fourth source driver circuit 340 with different enable starting time points t11, t21, t31 and/or t41 of the internal clock SIC_CLK. That is, t11, t21, t31 and/or t41 may not overlap one another at the same time. According to some example embodiments, the first source driver circuit 310, the second source driver circuit 320, the third source driver circuit 330 and/or the fourth source driver circuit 340 may have the input time points t11, t21, t31 and/or t41 in a sequential order, or may randomly have the input time points t11, t21, t31 and/or t41 in a non-sequential order. According to some example embodiments, the order of the input time points t11, t21, t31 and/or t41 may be determined in accordance with a preset (or alternately given) manner (for example, spaced distance between the source driver circuits) that is not sequential in the order of t11, t21, t31 and/or t41.

For example, the timing controller 200 may provide the first source driver circuit 310, the second source driver circuit 320, the third source driver circuit 330 and/or the fourth source driver circuit 340 with different duties of the internal clock SIC_CLK. The timing controller 200 may set a high duty width and/or a low duty width and provide the set duty widths to the source driver circuit. In detail, the timing controller 200 may differently set a duty width w1 of the first internal clock 310_CLK1, a duty width w2 of the second internal clock 320_CLK1, a duty width w3 of the third internal clock 330_CLK1 and/or a duty width w4 of the fourth internal clock 340_CLK1 and provide the different duty widths to the source driver circuits 310, 320, 330 and/or 340, respectively. According to some example embodiments, the duty widths w1, w2, w3 and/or w4 may be different values.

Otherwise, according to some example embodiments, the timing controller 200 may provide the first source driver circuit 310, the second source driver circuit 320, the third source driver circuit 330 and/or the fourth source driver circuit 340 with different enable starting times t11, t21, t31 and/or t41 and different duties of the internal clock SIC_CLK. As shown in FIG. 8, the timing controller 200 may input the internal clock CLK1 to the source driver circuits 310, 320, 330 and/or 340 at the different time points t11, t21, t31 and/or t41. At this time, the duty widths w1, w2, w3 and/or w4 of the internal clocks may not be equal to one another. That is, the duty widths w1, w2, w3 and/or w4 may have different values or at least one of the duty widths w1, w2, w3 and/or w4 may have a different value. However, a rising edge and a falling edge of the internal clock signal SIC_CLK1 are not overlapped with each other. That is all of t11, t21, t31, t41, t12, t22, t32 and t42 should be different time points.

As described above, the timing controller 200 may control the internal clock SIC_CLK1 to spread the rising edge and the falling edge of the clock signal, so that the output spreading times at which the image data is input to the data lines may not overlap each other.

Figure 11:
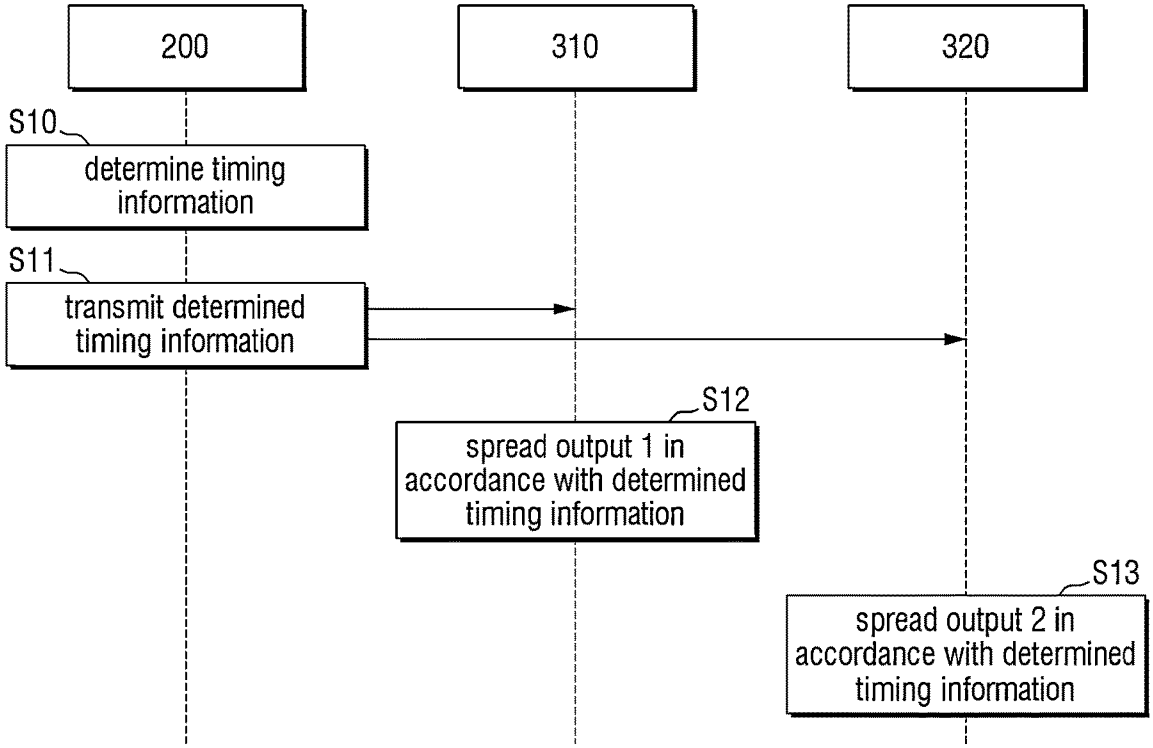
FIG. 11 illustrates an operation method of a display driving circuit according to some example embodiments.

FIG. 11 illustrates an operation method of a display driving circuit according to some example embodiments. For convenience of description, it is assumed that the display driving circuit includes a first source driver circuit 310 and/or a second source driver circuit 320, but the example embodiments of the inventive concepts may be applied to various numbers of source driver circuits.

Referring to FIG. 11, the display driving circuit 600 determines timing information in the timing controller 200 (S10), and outputs the source control signal C based on the determined timing information (S11).

The first source driver circuit 310 outputs first image data by spreading to a first output in accordance with the timing information (S12). The second source driver circuit 320 outputs second image data by spreading to a second output in accordance with the timing information (S13). The first output may have an output spreading time different from that of the second output.

The output spreading time may be differently set for each, or one or more, source driver circuit in accordance with some example embodiments described with reference to FIGS. 7 to 10.

Figure 12:
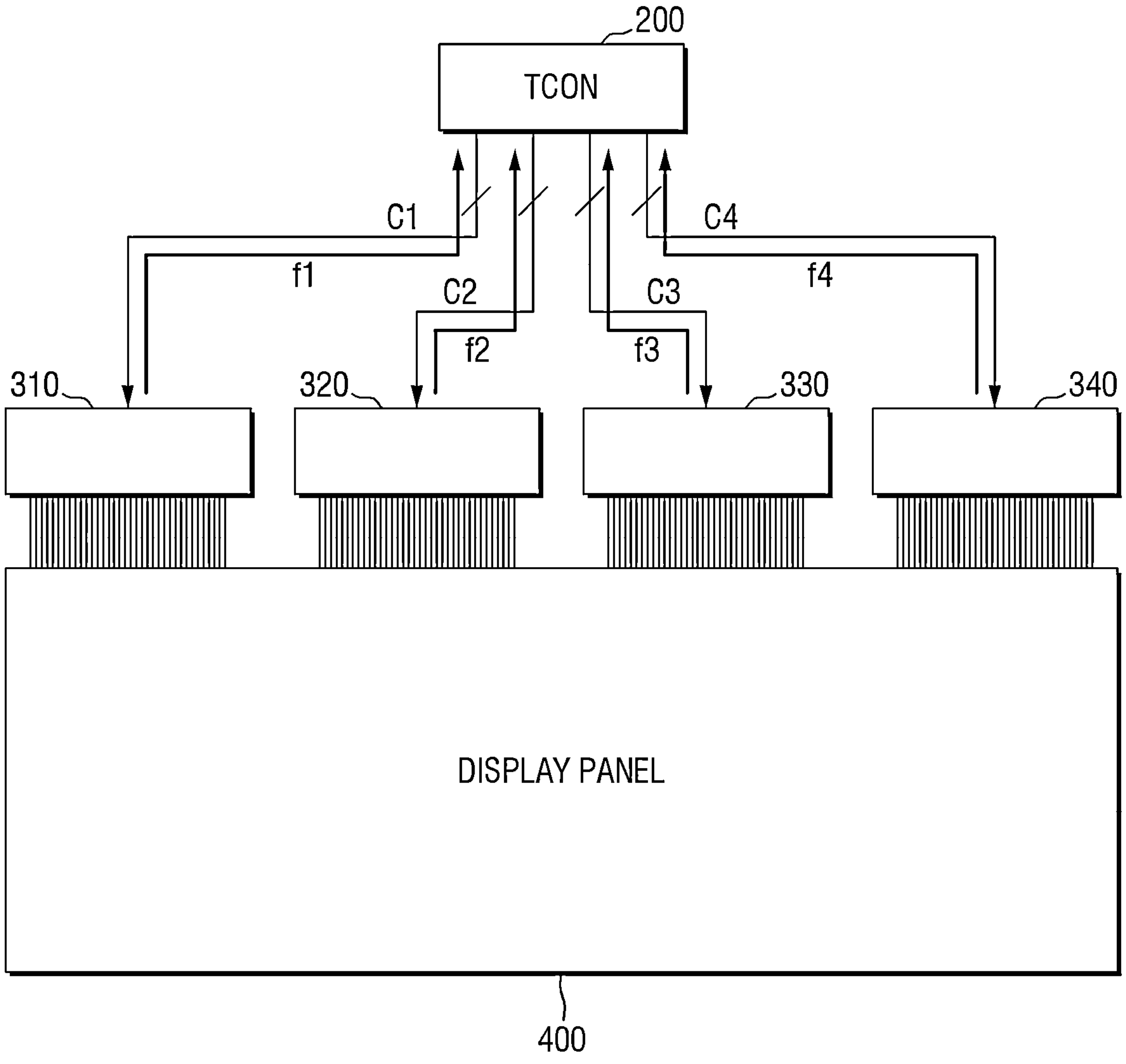
FIG. 12 is a conceptual view illustrating an operation of a display device according to some example embodiments.

FIG. 12 is a conceptual view illustrating an operation of a display device according to some example embodiments.

Referring to FIG. 12, the source driver circuits 310, 320, 330 and/or 340 may output feedback signals f1, f2, f3 and/or f4 to the timing controller 200. The timing controller 200 may receive the feedback signal from each of the source driver circuits.

The feedback signals f1, f2, f3 and/or f4 may include information on an actual output spreading time in each, or one or more, of the source driver circuits 310, 320, 330 and/or 340. That is, the first feedback signal f1 may include information on a first actual output spreading time in the first source driver circuit 310. That is, the actual output spreading time may include a time point at which the source driver outputs the image data to the data lines, that is, the display panel 400.

When receiving the feedback signals f1, f2, f3 and/or f4 from the plurality of source driver circuits, respectively, the timing controller 200 may reset the source control signal so that the output spreading time does not overlap another output spreading time.

According to some example embodiments, the timing controller 200 may reset the source control signal to control an image data input time point in each, or one or more, of the source driver circuits 310 to 340 in accordance with the feedback signal T.

Otherwise, according to some example embodiments, the timing controller 200 may differently control the internal clock CLK1 provided to the source driver circuits 310 to 340 in accordance with the feedback signal 'f' so that the output spreading time of each, or one or more, source driver circuit does not overlap another output spreading time. At this time, "controlling the operation clock" means that at least one of the high duty, the low duty or the enable starting time of the operation clock is controlled.

Otherwise, according to some example embodiments, the timing controller 200 may reset the source control signal to select different output enable patterns from among the plurality of output enable patterns included in the source driver circuits 310 to 340 in accordance with the feedback signal T.

Figure 13:
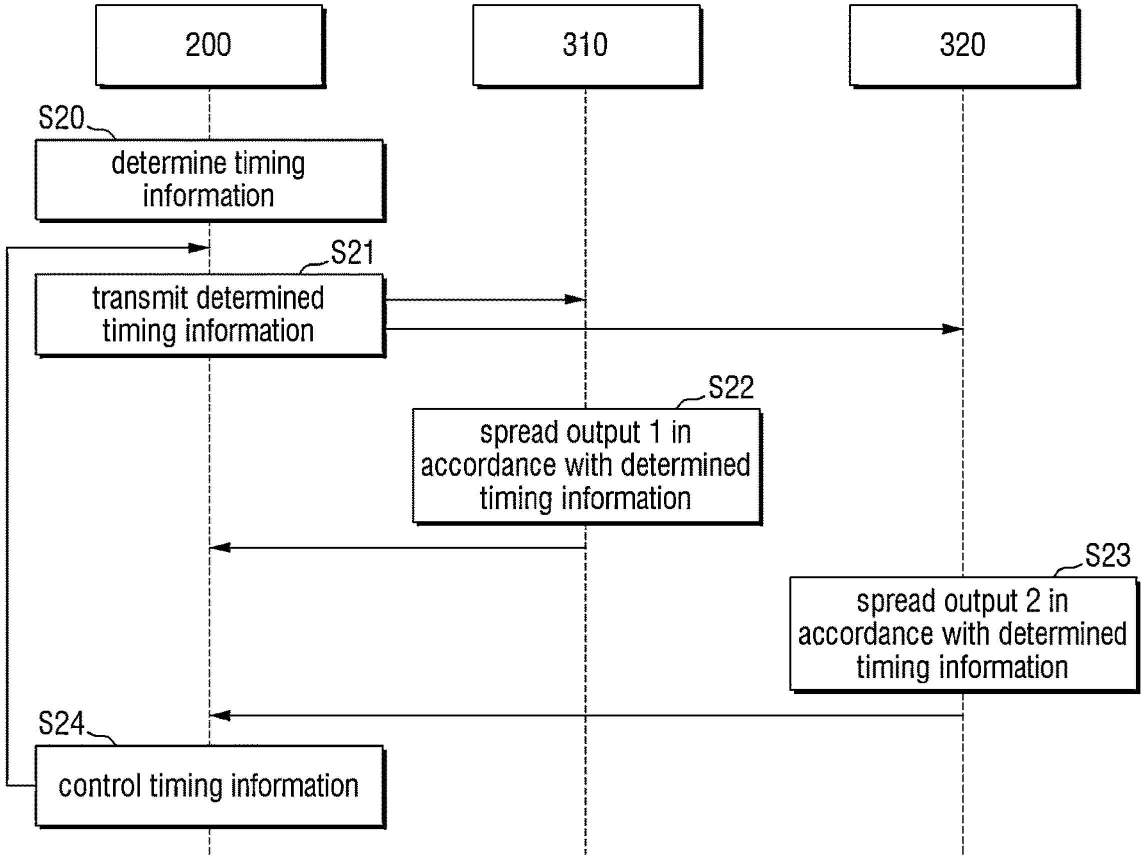
FIG. 13 illustrates an operation method of a display driving circuit according to some example embodiments.

FIG. 13 illustrates an operation method of a display driving circuit according to some example embodiments.

Referring to FIG. 13, the display driving circuit 600 determines timing information in the timing controller 200 (S20), and outputs the source control signal based on the determined timing information (S21).

The first source driver circuit 310 outputs first image data by spreading to a first output in accordance with the timing information (S22). Then, the first source driver circuit 310 may generate a first feedback signal f1 for the first output spreading time and output the first feedback signal f1 to the timing controller 200.

The second source driver circuit 320 outputs second image data by spreading to a second output in accordance with the timing information (S23). The first output may have an output spreading time different from that of the second output. Then, the second source driver circuit 320 may generate a second feedback signal f2 for a second output spreading time and output the second feedback signal f2 to the timing controller 200.

The timing controller 200 may check whether the output spreading time of the plurality of source driver circuits is overlapped with another output spreading time, based on the first feedback signal f1 and the second feedback signal f2, and may control the timing information (S24). The timing controller 200 outputs the controlled timing information to the first source driver circuit 310 and the second source driver circuit 320. Therefore, the display driving circuit 600 may reduce, or prevent, the first output spreading time and the second output spreading time of the following operation from being overlapped with each other.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Although some example embodiments of the inventive concepts have been described with reference to the accompanying drawings, it will be apparent to those skilled in the art that the inventive concepts can be embodied in other specific forms without departing from technical spirits and essential characteristics of the inventive concepts. Thus, some example embodiments are to be considered in all, or one or more, respects as illustrative and not restrictive.

What is claimed is:

1. A display driving circuit comprising:

a timing controller configured to output image data and a source control signal;

a first source driver circuit configured to output first source data of the image data by activating a plurality of first data lines in accordance with the source control signal, the plurality of first data lines having a first output spreading time indicating at least one of a rising edge or a falling edge of a first clock signal, and output a first feedback signal to the timing controller;

a second source driver circuit configured to output second source data of the image data by activating a plurality of second data lines in accordance with the source control signal, the plurality of second data lines having a second output spreading time indicating at least one of a rising edge or a falling edge of a second clock signal, and output a second feedback signal to the timing controller; and a third source driver circuit configured to output third source data of the image data by activating a plurality of third data lines in accordance with the source control signal, the plurality of third data lines having a third output spreading time indicating at least one of a rising edge or a falling edge of a third clock signal, and output a third feedback signal to the timing controller, wherein the timing controller is further configured to determine first output time points of the plurality of first data lines based on the first feedback signal, second output time points of the plurality of second data lines based on the second feedback signal, and third output time points of the plurality of third data lines based on the third feedback signal, and reset the source control signal based on the first output time points, the second output time points, and the third output time points such that the first output spreading time, the second output spreading time, and the third output spreading time do not overlap.

2. The display driving circuit of claim 1, wherein the source control signal is configured to randomly control time points at which the image data are input to the first source driver circuit, the second source driver circuit and the third source driver circuit, so that time points at which the first source data, the second source data and the third source data begin to be provided to a display panel do not overlap one another.

3. The display driving circuit of claim 1, wherein the first source driver circuit includes a first output spreading circuit connected to the plurality of first data lines, the second source driver circuit includes a second output spreading circuit connected to the plurality of second data lines, and the third source driver circuit includes a third output spreading circuit connected to the plurality of third data lines.

4. The display driving circuit of claim 3, wherein each of the first output spreading circuit, the second output spreading circuit and the third output spreading circuit includes a plurality of output enable patterns, the plurality of output enable patterns configured to activate outputs of the plurality of first data lines, the plurality of second data lines, and the plurality of third data lines in accordance with the source control signal.

5. The display driving circuit of claim 1, wherein the timing controller is configured to set a first internal clock, a second internal clock and a third internal clock differently from one another so that the first internal clock is provided to the first source driver circuit, the second internal clock is provided to the second source driver circuit, and the third internal clock is provided to the third source driver circuit.

6. A display device comprising:

a display panel including a plurality of pixels connected to a plurality of first data lines and a plurality of second data lines;

a timing controller configured to output a first source control signal and a second source control signal;

a first source driver circuit configured to output first source data to first pixels, of the plurality of pixels, connected to the plurality of first data lines in accordance with the first source control signal, and output a first feedback signal to the timing controller; and a second source driver circuit configured to output second source data to second pixels, of the plurality of pixels, connected to the plurality of second data lines in accordance with the second source control signal, and output a second feedback signal to the timing controller, wherein the timing controller is further configured to control a first internal clock of the first source driver circuit and a second internal clock of the second source driver circuit so that output spreading times at which image data is input to the plurality of first data lines and the plurality of second data lines do not overlap, by outputting the first internal clock to the first source driver circuit based on the first feedback signal, and outputting the second internal clock different from the first internal clock to the second source driver circuit based on the second feedback signal.

7. The display device of claim 6, wherein the timing controller is configured to control a first time point at which the first source data is input to the first source driver circuit, through the first source control signal and a second time point at which the second source data is input to the second source driver circuit, through the second source control signal, so that the first time point and the second time point are different from each other.

8. The display device of claim 6, wherein
the first source driver circuit includes a plurality of output enable patterns, and
the first source driver circuit is configured to
select one of the plurality of output enable patterns as a first output enable pattern in accordance with the first source control signal, and
output the first source data to the plurality of first data lines in the first output enable pattern.

9. The display device of claim 8, wherein
the second source driver circuit includes the plurality of output enable patterns, and
the second source driver circuit is configured to select one of the plurality of output enable patterns, which is different from the first output enable pattern, as a second output enable pattern in accordance with the second source control signal, and
output the second source data to the plurality of second data lines in the second output enable pattern.

10. A display driving circuit comprising:
a first source driver circuit including a plurality of output enable patterns, the first source driver circuit configured to output first image data to a plurality of first data lines of a display panel and output a first feedback signal;
a second source driver circuit including the plurality of output enable patterns, the second source driver circuit configured to output second image data to a plurality of second data lines of the display panel and output a second feedback signal; and
a timing controller configured to
output a first source control signal to the first source driver circuit indicating a first output enable pattern of the plurality of output enable patterns,
output a second source control signal to the second source driver circuit indicating a second output enable pattern, of the plurality of output enable patterns, different from the first output enable pattern,
determine first output time points of the plurality of first data lines based on the first feedback signal and second output time points of the plurality of second data lines based on the second feedback signal, and
control the first source driver circuit based on the first output time points and the second source driver circuit based on the second output time points such that a first output spreading time of the plurality of first data lines and a second output spreading time of the plurality of second data lines are different from each other.

11. The display driving circuit of claim 10, wherein the timing controller is configured to control an input time point of the first image data to the first source driver circuit and an input time point of the second image data to the second source driver circuit in accordance with the first feedback signal and the second feedback signal.

12. The display driving circuit of claim 10, wherein the timing controller is configured to control a first internal clock provided to the first source driver circuit and a second internal clock provided to the second source driver circuit differently from each other.

13. The display driving circuit of claim 10, wherein the first source driver circuit includes a first output spreading circuit connected to the plurality of first data lines, including the plurality of output enable patterns, and
the second source driver circuit includes a second output spreading circuit connected to the plurality of second data lines, including the plurality of output enable patterns.

14. The display driving circuit of claim 13, wherein the first output spreading circuit is configured to:
select the first output enable pattern from the plurality of output enable patterns in accordance with the first source control signal of the timing controller; and
output the first image data to the plurality of first data lines in accordance with the first output enable pattern.

15. The display driving circuit of claim 10, wherein the timing controller is configured to:
provide a first internal clock to the first source driver circuit; and
provide a second internal clock different from the first internal clock to the second source driver circuit.

16. The display driving circuit of claim 1, wherein
each of the first source driver circuit, the second source driver circuit and the third source driver circuit includes a plurality of output enable patterns, and
the source control signal indicates an output enable pattern of the plurality of output enable patterns for respective source driver circuits of the first source driver circuit, the second source driver circuit, and the third source driver circuit.

17. The display device of claim 6, wherein
the first source driver circuit includes a plurality of output enable patterns,
the second source driver circuit includes the plurality of output enable patterns,
the first source driver circuit is configured to output the first source data in a first output enable pattern of the plurality of output enable patterns in accordance with the first source control signal from the timing controller indicating the first output enable pattern, and
the second source driver circuit is configured to output the second source data in a second output enable pattern, of the plurality of output enable patterns, different from the first output enable pattern in accordance with a second source control signal from the timing controller.

18. The display driving circuit of claim 10, wherein
the first source driver circuit includes the plurality of output enable patterns,
the second source driver circuit includes the plurality of output enable patterns, and
the timing controller is configured to
output the first source control signal to the first source driver circuit indicating the first output enable pattern of the plurality of output enable patterns,
output the second source control signal to the second source driver circuit indicating the second output enable pattern, of the plurality of output enable patterns, different from the first output enable pattern.

* * * * *